United States Patent [19]

Harwood

[11] 3,924,266

[45] Dec. 2, 1975

[54] AUTOMATIC LUMINANCE CHANNEL BANDWIDTH CONTROL APPARATUS RESPONSIVE TO THE AMPLITUDE OF COLOR IMAGE INFORMATION

[75] Inventor: Leopold Albert Harwood, Somerville, N.J.

[73] Assignee: RCA Corporation, New York, N.Y.

[22] Filed: Aug. 30, 1974

[21] Appl. No.: 501,963

[52] U.S. Cl. ............................ 358/38; 178/DIG. 19
[51] Int. Cl. ............................................. H04n 9/02
[58] Field of Search ............................... 358/37–39; 178/DIG. 19; 325/427

[56] References Cited

UNITED STATES PATENTS

| | | | |
|---|---|---|---|
| 2,895,004 | 7/1959 | Fredendall | 358/38 |
| 2,905,751 | 9/1959 | Ralston | 178/DIG. 19 |
| 2,910,528 | 10/1959 | Petersen | 178/DIG. 19 |
| 2,917,572 | 12/1959 | Stubbe | 178/DIG. 19 |
| 3,139,484 | 6/1964 | Richman | 358/38 |
| 3,167,611 | 1/1965 | St. John | 358/38 |

*Primary Examiner*—Robert L. Griffin
*Assistant Examiner*—John C. Martin
*Attorney, Agent, or Firm*—Eugene M. Whitacre; Peter M. Emanuel

[57] ABSTRACT

In a television signal processing system, including separate channels for processing luminance and chrominance signal portions of a composite video signal, apparatus is provided for automatically varying the bandwidth of the luminance channel in accordance with the amplitude of color information signals.

In an illustrated arrangement, apparatus for controlling the bandwidth of the luminance channel is coupled to a color demodulator circuit which is included in the chrominance channel for generating, for example R-Y, G-Y and B-Y color difference signals. The bandwidth of the luminance channel is controlled to vary in inverse relationship to the amplitude of the demodulated color difference signal having the largest amplitude.

9 Claims, 2 Drawing Figures

Figure 1:
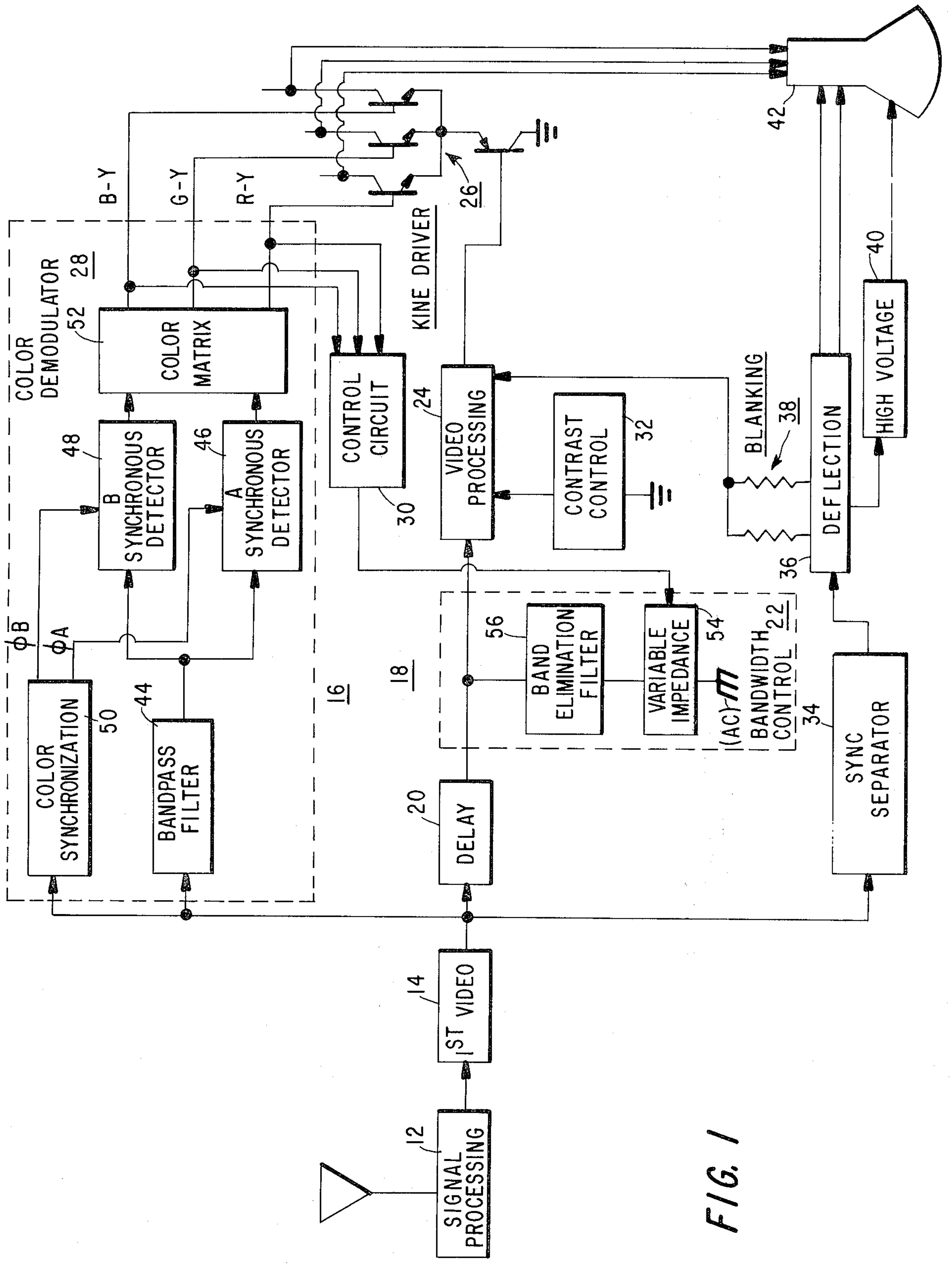

AUTOMATIC LUMINANCE CHANNEL BANDWIDTH CONTROL APPARATUS RESPONSIVE TO THE AMPLITUDE OF COLOR IMAGE INFORMATION

The present invention relates to improvement of the transient response and fine detail resolution of television signal processing systems, and particularly relates to apparatus for automatically controlling the bandwidth of television video processing systems.

Television video signals generally comprise a relatively wide bandwidth luminance signal portion representing brightness information and a relatively narrow bandwidth chrominance signal portion representing color information which extends over the higher frequency range of the luminance signal spectrum. The chrominance signal portion is formed by modulating a color subcarrier signal in accordance with color information and is interleaved in frequency with the higher frequency components of the luminance signal portion. The fine detail image information is contained in the relatively high frequency components of the luminance signal portion. In color television practice, images having large amounts of fine detail have small amounts of color or no color and are therefore represented by video signals having luminance signal portions extending into the frequency range of the chrominance signal portion but being substantially free of chrominance signal portions. In addition to these signals a televsion video signal also includes a color burst or synchronizing signal which provides phase information used to demodulate the chrominance signal portion.

In order to optimize the fine detail resolution and sharp tonal transition capabilities of a color television receiver, it is desirable that the luminance signal processing channel of the receiver have a relatively wide bandwidth. However, this bandwidth is usually restricted by means of a band elimination filter or the like to substantially remove the chrominance signals from the luminance channel and thereby prevent beat or interference patterns on the imaging device of the receiver. Thus, a compromise is generally made between a wide band luminance channel for fine detail resolution and sharp tonal transitions, and a narrow band luminance channel for inhibiting the generation of interference patterns on the imaging device.

Since interference patterns will not readily be generated when the luminance channel is relatively free of chrominance signals, apparatus previously has been proposed for automatically controlling the bandwidth of the luminance channel in accordance with various portions of the video signal indicative of the amount of chrominance signal portions present in the luminance channel. Such apparatus is described, for example, in the following U.S. Pat. No. 2,895,004, entitled, "Color Television," issued to G. L. Fredendall on July 14, 1959, and assigned to the same assignee as the present invention; No. 2,905,751, entitled, "Monochrome Channel Bandwidth Modifying Apparatus for Color Television," issued to G. Ralston on Sept. 22, 1959; 2,910,528, entitled, "Burst Control of Color Television Receiver Bandwidth," issued to O. E. Peterson on Oct. 27, 1959; No. 3,139,484, entitled, "Compatible Color-Television Apparatus," issued to D. Richman on June 30, 1964; No. 3,167,611, entitled, "Color-Television Apparatus for Improving Resolution During Monochrome Reception," issued to K. M. St. John on Jan. 26, 1963; and No. 3,749,824, entitled, "Suppression Filter for Carrier-Chrominance Signals Utilizing a Tapped Delay Line," issued to T. Sagashima et al. on July 31, 1973. Such apparatus tends to improve the transient response and fine detail resolution of video processing systems while tending to minimize the generation of interference patterns. However, the effectiveness of these apparatus is limited by the manner in which the amount of chrominance signal portion is determined. That is to say, the means of the generation of the control signal according to which the bandwidth of the luminance channel is varied is significant.

In one type of apparatus for automatically controlling the bandwidth of the luminance channel, a bandpass filter is used to detect the presence of video signals in the frequency range of the chrominance signal portions. The bandwidth of the luminance channel is modified in inverse relationship to the amplitude of these detected signals. In this type of apparatus, when an image has relatively large amounts of fine detail and relatively small amounts of color content, manifested by a video signal having a luminance signal portion extending into the chrominance frequency range but substantially free of chrominance signal portions, the luminance channel will be incorrectly narrowed when it should be widened. For this reason, it is undesirable to control the bandwidth of the luminance channel in accordance with the amplitudes of video signals present in the frequency range of the chrominance signal portion of the video signal.

In another type of apparatus, the bandwidth of the luminance channel is controlled in accordance with the presence of the color burst or synchronizing signal. The color burst signal is a relatively constant amplitude signal which is present for polychromatic transmission and absent for monochromatic transmission. In such apparatus, the bandwidth of the luminance channel is made relatively large for monochromatic transmission and relatively small for polychromatic transmission. However, since the burst signal is a relatively constant amplitude signal, the burst signal is not readily useful for dynamically controlling the bandwidth of the luminance channel in accordance with the amount of color in the image.

In accordance with the present invention, an apparatus is provided for dynamically varying the bandwidth of a luminance channel of a television video signal processing system. The television video signal processing system is arranged to generate an image from a video signal having a relatively wide frequency range including luminance signal portions and a relatively narrow frequency signal range including chrominance signal portions interleaved in frequency with the high frequency portions of the luminance signal. Means are coupled to the source of video signals for separating chrominance signal portions from luminance signal portions and for generating from the chrominance signal portions a color information signal representing the amount of color information present in the image. The luminance channel is provided with means responsive to the color information signals for varying the bandwidth of the luminance channel in inverse relationship to the amount of color information present in the image.

In accordance with another aspect of the invention, a color demodulator, included in the video processing system, generates color difference signals representing, for example, the R-Y B-Y and G-Y color information. These color difference signals are coupled to means for selected the color difference signal having the largest amplitude and generating therefrom the color information signal.

Figure 2:
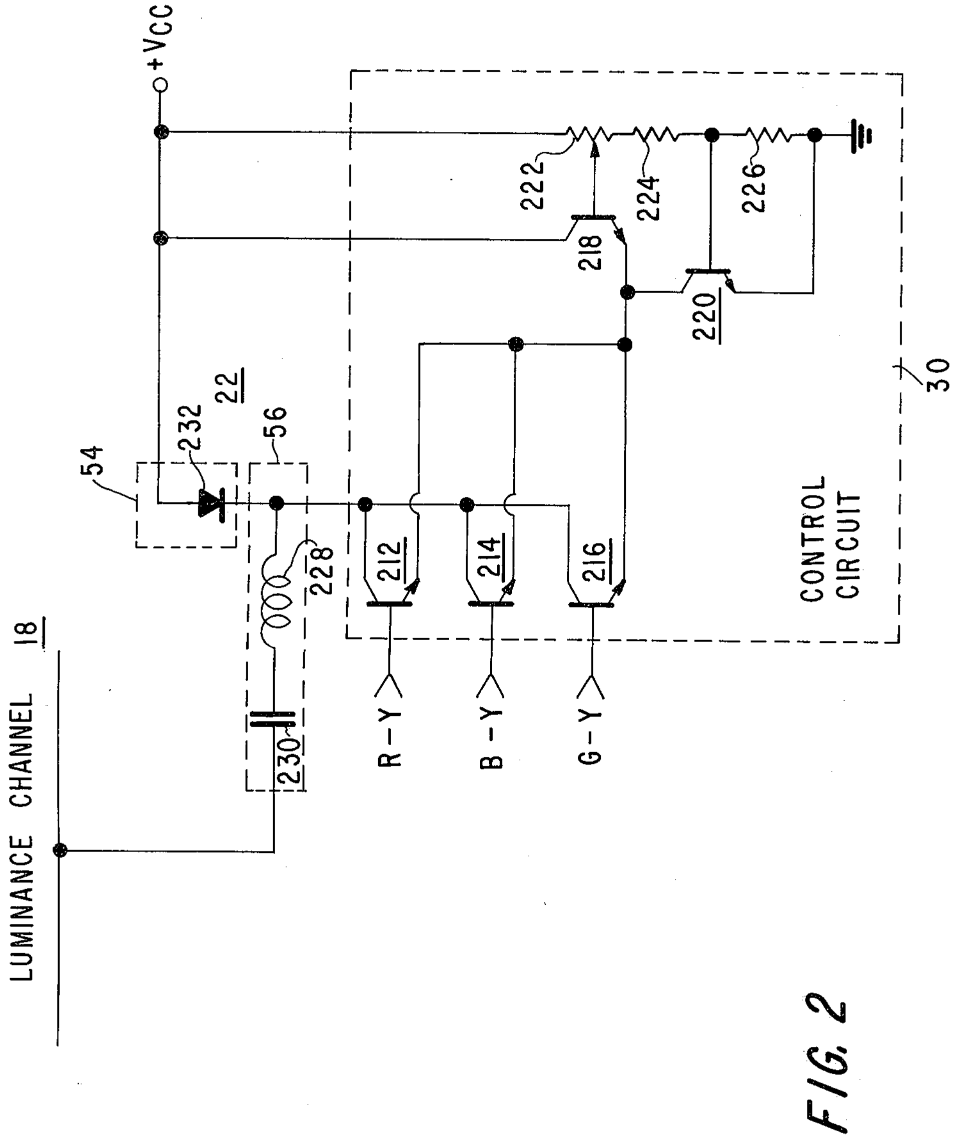

These and other aspects of the present invention will be best understood by the following detailed description in conjunction with the accompanying drawing, in which:

FIG. 1 of the drawing shows, partially in block diagram form and partially in schematic diagram form, the general arrangement of a color television receiver including apparatus constructed in accordance with the present invention for controlling the bandwidth of a luminance channel in response to a color information signal derived from chrominance signal portions of the video signal; and FIG. 2 is a schematic diagram of portions of the apparatus shown in block diagram form in FIG. 1.

Referring now to FIG. 1, the general arrangement of a color television receiver employing the present invention includes a signal processing unit 12 responsive to radio frequency (RF) television signals received by an antenna for generating, by means of suitable intermediate frequency circuits (not shown) and detection circuits (not shown), a video signal comprising chrominance, luminance and synchronizing signal portions. The detected video signal is coupled from signal processing unit 12 to a first video amplifier 14. Respective portions of the output signal of first video amplifier 14 are coupled to a chrominance channel 16, including a color demodulator 28, and to a luminance channel 18, including a delay unit 20, a bandwidth control unit 22 and a video processing unit 24. Color demodulator 28 serves to demodulate the chrominance signal portions of the video signal to produce, for example, R-Y, B-Y and G-Y color difference signals. The R-Y, B-Y and G-Y color difference signals are applied to a driver or amplifier 26, where these signals are combined with the luminance output (Y) of signal processing unit 24. The R-Y, B-Y and G-Y color difference signals are also coupled to a control circuit 30 which serves to generate a color information signal representing the amount of color information present in the image. Delay unit 20 is provided in luminance channel 18 to equalize the time delays of chrominance and luminance signals respectively processed in chrominance channel 16 and luminance channel 18. The output of delay unit 20 is coupled to bandwidth control unit 22. Bandwidth control unit 22 serves to control the bandwidth of the luminance channel in response to the color information signal generated by control circuit 30. The output of bandwidth control circuit 22 is coupled to video processing unit 24 which functions to amplify and process the video signal before such processed signal is direct coupled to driver 26. A contrast control unit 32 is coupled to video processing unit 24 to control the amplitude of the processed video signal and thereby control the contrast of the images produced by an image reproducer such as a kinescope 42. A suitable contrast control arrangement is described in U.S. Pat. No. 3,804,981, entitled, "Brightness Control," issued to Jack Avins on Apr. 16, 1974, and assigned to the same assignee as the present invention. Another portion of the output signal of first video amplifier 14 is coupled to a synchronizing signal separator 34 which serves to separate horizontal and vertical synchronization pulses from the video signal. The synchronization pulses are coupled from sync separator 34 to deflection circuits 36. Deflection circuits 36 are coupled to kinescope 42 and to a high voltage unit 40 to control deflection or sweep of an electron beam in kinescope 42 in a conventional manner. Deflection circuits 36 also function to generate blanking signals from the horizontal and vertical pulses. The blanking signals are coupled to video processing unit 24 to inhibit the output of unit 24 during the vertical and horizontal retrace periods to ensure cutoff of the kinescope 42 during these respective periods.

In color demodulator 28, a bandpass filter 44 serves to couple signals in the frequency range of the chrominance signal portions of the video signal, that is, for instance, signals in the frequency range between approximately 2 and 4.2 MHz, to synchronous detectors 46 and 48 relatively unattenuated, while relatively attenuating signals outside that frequency range. A color synchronization unit 50 serves to separate the color burst or synchronization signal representing color phase information from the video signal and to generate therefrom two color phase reference signals respectively representing the phase angles $\theta$A and $\theta$B, of two preselected colors. Synchronous detectors 46 and 48 are of a conventional type which is responsive to chrominance signals and a color phase reference signal to generate color signal image information. For example, if the $\theta$A and $\theta$B color phase reference signals represent, respectively, the phase angles of the difference signals R-Y and B-Y, "A" synchronous detector 46 and "B" synchronous detector 48 will demodulate, respectively, the color signals representing, respectively, image information associated with the difference signals R-Y and B-Y. It should be appreciated that other phase angles, such as those commonly referred to as the in-phase (I) and quadrature (Q) color phase angles, may be selected for use in color demodulator 28. The output signals of synchronous detectors 46 and 48 are coupled to a color matrix unit 52 which serves to algebraically combine output signals of synchronous detectors 46 and 48 to generate three color difference signals such as R-Y, B-Y and G-Y.

A band elimination filter 56 associated with bandwidth control unit 22 serves to remove signals having frequencies in the frequency range of the chrominance signal portion from the luminance channel. Band elimination filter 56 is a shunt type filter and is coupled to AC ground through a variable impedance 54. Since the series circuit including band elimination filter 56 and variable impedance 54 shunts luminance channel 18, the bandwidth of the signals removed from luminance channel 18 will vary in inverse relationship to the impedance of variable impedance 54. The impedance of variable impedance 54 is controlled in inverse relationship to the amplitude of the color information signal generated by control circuit 30. The color information signal generated by control circuit 30 represents the amount of color information present in the image. Specifically, control circuit 30 serves to select the color difference signal, R-Y, B-Y or G-Y, having the largest amplitude to control the bandwidth of luminance channel 18. Thus, signals in the frequency range of chrominance signal portions will be removed from luminance channel 18, or, alternatively, the bandwidth of luminance channel 18 will be decreased in inverse relationship to the amount of color information present in the image.

The general circuit arrangement shown in FIG. 1 is suitable for use in a color television receiver of the type shown, for example, in RCA Color Television Service Data 1970 No. T19 (a CTC-49 type receiver), published by RCA Corporation, Indianapolis, Ind.

Bandwidth control circuit 22 in conjunction with control circuit 30 and color demodulator 28 are arranged for separating the interleaved chrominance signal portions from the luminance signal portions and for generating therefrom a color information signal representing the amount of color information present in the image. Moreover, these elements provide a bandwidth control apparatus which is particularly effective in producing images having improved fine detail resolution while being relatively free of interference patterns due to the presence of chrominance signal portions in luminance channel 18. This desired result is obtained since the bandwidth of luminance channel 18 is controlled in response to a synchronously detected signal representing the amount of color in the image rather than merely in response to signals within the frequency range of the chrominance signal portions. Thus, when the image contains large amounts of fine detail, manifested by a video signal being relatively free of chrominance signal portions but having luminance signal portions extending into the frequency range of the chrominance signal portions, the bandwidth of luminance channel 18 will be correctly increased. This is in contrast to the bandwidth being incorrectly decreased as would be the case if the bandwidth were controlled in accordance merely in response to detection of signals in the frequency range of the chrominance signal portion.

In addition, the bandwidth control apparatus of FIG. 1 provides for dynamic control of the bandwidth of luminance channel 18 since the bandwidth of luminance channel 18 may be varied in response to a signal continually representing the amount of color in an image rather than in response to a signal representing the presence or absence of polychromatic transmission.

Referring now to FIG. 2, there is shown a schematic diagram of an embodiment of portions of the present invention, including control circuit 30, band elimination filter 56 and variable impedance 54, shown in block diagram form in FIG. 1. The serially connected circuit formed by band elimination filter 56 and variable impedance 54, the latter being shown as diode 232, shunts luminance channel 18 to the DC supply voltage $V_{cc}$ (AC ground). Band elimination filter 56 is shown as a shunt type of color subcarrier filter or trap formed by a serially connected inductor 228 and a capacitor 230, the values of which are selected to provide band elimination filter 56 with a center frequency approximately equal to the frequency of the color subcarrier, that is, for example, 3.58 MHz. Control circuit 30 comprises NPN transistors 212, 214 and 216 arranged in an "OR" circuit type of configuration. The bases of transistors 212, 214 and 216 are supplied with the R-Y, B-Y and G-Y color difference signals. The collectors and emitters of transistors 212, 214 and 216 are connected to respective common junction points. The jointly connnected collectors of transistors 212, 214 and 216 are connected to the junction of band elimination filter 56 and variable impedance 54. The voltage appearing at the jointly connected collectors of transistors 212, 214 and 216 varies inversely as the amplitude of the one of the color difference signals, R-Y, B-Y or G-Y, having the largest amplitude. Thus, as the amplitude of the color difference signal having the largest amplitude increases, the voltage at the cathode of diode 232 decreases causing the impedance of diode 232 to decrease. As the amplitude of the color difference signal having the largest amplitude decreases, the voltage at the cathode of diode 232 increases, causing the impedance of diode 232 to increase. The jointly connected emitters of transistors 212, 214 and 216 are connected to the emitter of an NPN transistor 218 forming in conjunction with an NPN transistor 220, potentiometer 222 and resistors 224 and 226, a biasing circuit which serves to permit the adjustment of the voltage at the jointly connected emitters of transistors 212, 214 and 216. In this manner, a suitable current is supplied to diode 232 to control its impedance in accordance with the amplitude of the one of the color difference signals, R-Y, B-Y or G-Y, having the largest amplitude. Since the series circuit including band elimination filter 56 and variable impedance 54 shunts the luminance channel 18, the bandwidth of the luminance channel varies in direct relationship to the impedance of variable impedance 54, or, conversely, in inverse relationship to the amplitude of the one of the color difference signals having the largest amplitude.

It should be appreciated that although the means for separating the interleaved chrominance signal portions from the luminance signal portions and generating from the chrominance signal portions a color information signal representing the amount of color in the image was described as comprising a color demodulator as shown, by way of example, in FIG. 1, other apparatus for performing this function may be employed. This apparatus may, for instance, include a comb filter for separating the interlaced chrominance signal portions from the luminance signal portions. Further, it should be noted that although the invention has been described in terms of a color television receiver wherein a color information signal to control the bandwidth of the luminance channel signals is generated in the chrominance channel, a separate apparatus, outside of the chrominance channel, for generating a color information signal representing the amount of color in the image may be used if desired. That is, for instance, in a color television receiver employing automatic chroma control (ACC), wherein the gain is automatically adjusted in the chrominance channel in accordance with high frequency signal losses occurring in the transmission path of the video signal, as manifested by the amplitude of the color burst signal, it may be desirable to provide means in the luminance channel for separating interleaved chrominance signal portions from luminance signal portions and generating therefrom the color information signal to avoid interference of the automatic color control function with the luminance channel bandwidth control function. These and other modifications are contemplated to be within the scope of the invention.

What is claimed is:

1. Apparatus for processing television video signals representing an image, said signals having at least a relatively wide bandwidth luminance signal portion, a relatively narrow bandwidth chrominance signal portion interleaved with said luminance signal portions, and color synchronization signal portions, comprising:

a source of video signals;

means coupled to said source of video signals for separating said chrominance signal portions from said luminance and synchronization signal portions and for generating from said chrominance signal portions a color information signal representing the amplitude of color information present in said image; and a luminance signal channel coupled to said source of video signals for processing said luminance signal portions, said luminance signal channel including means responsive to said color information signal for varying the bandwidth of said luminance signal channel in inverse relationship to said amplitude of color information in said image.

2. The apparatus recited in claim 1 wherein said means for varying the bandwidth of said luminance channel comprises band elimination filter means for removing signals in the frequency range of said chrominance signal portions from said luminance channel and means coupled to said band elimination filter means responsive to said color information signal for controlling the bandwidth of said band elimination filter in direct relationship to the amplitude of color information in said image.

3. The apparatus recited in claim 1 wherein said means for separating said luminance signal portions and said chrominance signal portions comprises color demodulator means including means responsive to said color synchronization signal portions for generating a color phase reference signal and synchronous detector means responsive to said video signals and said color phase reference signal.

4. The apparatus recited in claim 3 wherein said color demodulator means generates color difference signals representing R-Y, B-Y and G-Y color information.

5. The apparatus recited in claim 4 including means responsive to said R-Y, B-Y and G-Y color difference signals for detecting the color difference signal having the largest amplitude and coupling said detected largest amplitude color difference signal to said means for controlling the bandwidth of said luminance channel.

6. The apparatus recited in claim 5 wherein said means for varying the bandwidth of said luminance channel comprises band elimination filter means for removing signals in the frequency range of said chrominance signal portions from said luminance channel and means coupled to said band elimination filter means responsive to said largest amplitude color difference signal for controlling the bandwidth of said band elimination filter means in direct relationship to the amplitude of said largest amplitude color difference signal.

7. The apparatus recited in claim 6 wherein said band elimination filter means is connected in shunt with said luminance signal channel and comprises a filter for attenuating signals in the frequency range of said chrominance signal portions connected in series with a variable impedance means, said variable impedance means responsive to said largest amplitude color difference signal, the impedance of said variable impedance means varying in inverse relationship to the amplitude of said largest amplitude color difference signal.

8. The apparatus recited in claim 7 wherein said filter includes an inductor and a capacitor connected in series and said variable impedance means includes a diode.

9. Apparatus for processing television video signals representing an image, said signals having at least a relatively wide bandwidth luminance signal portion, a relatively narrow bandwidth chrominance signal portion interleaved with said luminance signal portions, and color synchronization signal portions, comprising:

a source of video signals;

means for utilizing said video signals;

color demodulator means responsive to said video signals and said color synchronization signals for separating said chrominance signal portions and said luminance signal portions and for generating from said chrominance signal portions color difference signals;

means responsive to said difference signals for selecting the color difference signal having the largest amplitude;

a luminance channel coupled between said source of video signals and said means for utilizing said video signals for processing said luminance signal portions, said luminance channel including band elimination filter means for removing signals in the frequency range of said chrominance signal portions from said luminance channel; and means responsive to said greatest amplitude color difference signal for varying the bandwidth of said band elimination filter means in direct relationship to the amplitude of said largest amplitude color difference signal.

* * * * *